US012605303B2

(12) United States Patent
Wang et al.

(10) Patent No.: US 12,605,303 B2
(45) Date of Patent: Apr. 21, 2026

(54) PERISTALTIC STRUCTURE AND A MASSAGE DEVICE

(71) Applicant: Dongguan Aimeili Technology Co., Ltd., Guangdong (CN)

(72) Inventors: Wenbing Wang, Guangdong (CN); Haowei Ma, Boulder, CO (US)

(73) Assignees: Dongguan Aimeili Technology Co., Ltd., Dongguan (CN); ORLENA INC, Boulder, CO (US)

( * ) Notice: Subject to any disclaimer, the term of this patent is extended or adjusted under 35 U.S.C. 154(b) by 0 days.

(21) Appl. No.: 19/211,722

(22) Filed: May 19, 2025

(65) Prior Publication Data

US 2026/0060888 A1 Mar. 5, 2026

(30) Foreign Application Priority Data

Aug. 27, 2024 (CN) ......................... 202411183551.6
Aug. 27, 2024 (CN) ......................... 202422084386.0

(51) Int. Cl.
*A61H 23/02* (2006.01)

(52) U.S. Cl.
CPC ..... *A61H 23/02* (2013.01); *A61H 2201/1215* (2013.01); *A61H 2201/169* (2013.01)

(58) Field of Classification Search
CPC .............. A61H 19/00–50; A61H 23/02; A61H 23/0254; A61H 2201/1215; A61H 2201/169–1697
USPC ............................................................ 601/46
See application file for complete search history.

(56) References Cited

U.S. PATENT DOCUMENTS 12,127,993 B1 * 10/2024 Peng .................. A61H 23/0263
12,245,982 B1 * 3/2025 Zhao .................. A61H 23/0263
2009/0198158 A1 * 8/2009 Nan ................... A61H 23/0254 601/87
2010/0121234 A1 * 5/2010 Nan ....................... A61H 19/44 601/134

(Continued)

FOREIGN PATENT DOCUMENTS

DE 202024106176 U1 * 11/2024 ............. A61H 19/30
WO WO-2023175195 A1 * 9/2023 ............. A61H 19/44

OTHER PUBLICATIONS

Translation of DE 20-2024-106176. Accessed from Search on Aug. 5, 2025. (Year: 2024).*

(Continued)

*Primary Examiner* — Paige Kathleen Bugg

(57) ABSTRACT

A peristaltic structure and a massage device comprising an actuator, a connecting shaft, a connecting member, and a peristaltic lamination assembly. Advantages of the invention lies in that: the peristaltic lamination assembly of the invention is detachably mounted to the connecting shaft via the connecting member, offering a simple structure and ease of operation; the invention employs a plurality of peristaltic laminations and shaping laminations with eccentric structures to form a peristaltic lamination assembly, which eliminates the need for complex mechanical structures to solve the problem or making modifications to the connecting shaft's shape to achieve peristaltic motion, simplifying the design and facilitating installation; the connecting member is equipped with rotating beads, enabling combined peristaltic and rotational massage effects through rotating beads to enhance the massage performance.

4 Claims, 6 Drawing Sheets

(56) References Cited

U.S. PATENT DOCUMENTS

| | | | | |
|---|---|---|---|---|
| 2018/0298585 | A1* | 10/2018 | Yamashita | E02F 9/163 |
| 2018/0311105 | A1* | 11/2018 | Lonergan | A63H 3/04 |
| 2024/0358588 | A1* | 10/2024 | Liu | A61H 23/0263 |
| 2024/0407968 | A1* | 12/2024 | Zhang | A61H 23/02 |
| 2025/0032348 | A1* | 1/2025 | Li | A61H 7/007 |
| 2025/0177239 | A1* | 6/2025 | Huang | A61H 19/44 |
| 2025/0213423 | A1* | 7/2025 | Weekly | A61H 19/44 |

OTHER PUBLICATIONS

Translation of WO 2023/175195. Accessed from Search on Aug. 5, 2025. (Year: 2023).*

* cited by examiner

PERISTALTIC STRUCTURE AND A MASSAGE DEVICE

1. TECHNICAL FIELD

The invention relates to the technical field of massage, in particular to a peristaltic structure and a massage device.

2. BACKGROUND ART

In toys or massage devices, peristaltic structures are often required to achieve the peristaltic motion effect. In order to achieve the peristaltic effect, the conventional peristaltic structure usually adopts a relatively complex mechanical structure and is relatively high in cost.

3. SUMMARY OF THE INVENTION

The objective of the invention is to provide a peristaltic structure and a massage device to address the aforementioned issues, as detailed in the following description.

To achieve the above objective, the invention provides the following technical solutions:

a peristaltic structure and a massage device of the present invention includes an actuator, a connecting shaft, a connecting member, and a peristaltic lamination assembly;

the connecting shaft is detachably mounted to an output end of the actuator;

the peristaltic lamination assembly is detachably installed on the connecting shaft via the connecting member.

As a preferred option, the peristaltic lamination assembly comprises multiple sets of lamination assembly consisting of peristaltic laminations and shaping laminations.

As a preferred option, each shaping lamination is provided with a boss, lamination limiting holes, positioning lamination mounting holes, and lamination limiting posts; the peristaltic laminations are provided with peristaltic lamination mounting holes; the lamination limiting holes and positioning lamination mounting holes are eccentric holes, while the lamination limiting posts are eccentric columns, the peristaltic lamination mounting holes cooperate with the bosses; the shaping laminations are mounted on the connecting shaft via the positioning lamination mounting holes; the lamination limiting holes are disposed on one side of the lamination limiting posts; the lamination limiting holes and lamination limiting posts of two vertically adjacent positioning laminations are cooperated with each other.

As a preferred option, the peristaltic structure further includes a limiting member, the connecting member is provided with a mounting limiting hole, a connecting boss, and connecting limiting posts, the connecting member is detachably mounted to the connecting shaft via the limiting member, the limiting member is installed within the mounting limiting hole, the connecting limiting posts cooperate with the lamination limiting holes of positioning laminations, the peristaltic laminations are mounted on the connecting boss.

As a preferred option, the connecting member is further provided with rotating beads.

As a preferred option, the connecting member is disposed between the actuator and the peristaltic lamination assembly.

As a preferred option, the peristaltic structure further includes a lamination cover and a first pressing plate, the lamination cover is compressed onto the peristaltic lamination assembly via the first pressing plate.

As a preferred option, the peristaltic lamination assembly is disposed between the actuator and the connecting member;

A massage device includes a peristaltic structure and a silicone sleeve;

the peristaltic structure comprises an actuator, a connecting shaft, a connecting member, and a peristaltic lamination assembly;

the connecting shaft is detachably mounted to an output end of the actuator;

the peristaltic lamination assembly is detachably installed on the connecting shaft via the connecting member;

the silicone sleeve is sleeved over an exterior of the peristaltic structure.

A massage device includes a peristaltic structure, a silicone sleeve, and a vibration assembly;

the peristaltic structure comprises an actuator, a connecting shaft, a connecting member, and a peristaltic lamination assembly;

the connecting shaft is detachably mounted to an output end of the actuator;

the peristaltic lamination assembly is detachably installed on the connecting shaft via the connecting member;

the vibration assembly is disposed at one end of the connecting shaft, and the silicone sleeve is sleeved over an exterior of both the vibration assembly and the peristaltic structure.

As a preferred option, the vibration assembly includes a motor housing sleeve, a second pressing plate, a motor housing, a motor silicone sleeve, and a motor, the motor housing sleeve is mounted to one end of the motor housing to form a motor chamber, the motor silicone sleeve is sleeved over the motor, the motor is installed within the motor chamber, the motor housing sleeve is secured to an end of the connecting shaft via the second pressing plate.

As a preferred option, the connecting shaft is provided with a connection limiting section, a peristaltic assembly mounting section, a lamination cover limiting mounting section, a vibration assembly mounting section, and a second pressing plate mounting section, the connecting member is mounted to the connection limiting section via the limiting member, the lamination cover is installed on the lamination cover limiting mounting section, the second pressing plate is mounted to the second pressing plate mounting section, the peristaltic lamination assembly is installed on the peristaltic assembly mounting section, the vibration assembly is mounted to the vibration assembly mounting section, an axis of the peristaltic assembly mounting section and an axis of the vibration assembly mounting section are arranged at an angle; both the actuator and the connecting shaft are provided with cable feed-through holes, the cable feed-through hole of the actuator and the cable feed-through hole of the connecting shaft are interconnected, allowing cables to pass through the cable feed-through holes and electrically connect to the motor.

Advantages of the invention lies in that:

1. the peristaltic lamination assembly of the invention is detachably mounted to the connecting shaft via the connecting member, offering a simple structure and ease of operation;
2. the invention employs a plurality of peristaltic laminations and shaping laminations with eccentric structures to form a peristaltic lamination assembly, which eliminates the need for complex mechanical structures to solve the problem or making modifications to the connecting shaft's shape to achieve peristaltic motion, simplifying the design and facilitating installation;

3. the connecting member is equipped with rotating beads, enabling combined peristaltic and rotational massage effects through rotating beads to enhance the massage performance;
4. by integrating the vibration assembly at an angle relative to the peristaltic structure, the vibration assembly generates oscillatory rotation. Combined with vibrations from the internal vibration motor, the device achieves triple-action functionality (peristalsis, rotation, and vibration), delivering multifunctional effects and superior user experience.

4. BRIEF DESCRIPTION OF ACCOMPANY DRAWINGS

In order to illustrate the preferred embodiment of the invention or the technical scheme more clearly, the technical scheme of the preferred embodiment or the figures required by the prior art is further described briefly. Obviously, only partial embodiments of the invention are shown and the actual structure is not limited thereto. It is to be understood by those skilled in the art that other drawings can be obtained based on the drawings of the invention with non-creative labor.

1 actuator, 2 cable feed-through hole, 3 connecting member, 301 mounting limiting hole, 302 connecting limiting post, 303 connecting boss, 4 peristaltic lamination assembly, 400 peristaltic lamination mounting hole, 401 peristaltic lamination, 402 shaping lamination, 4021 boss, 4022 lamination limiting hole, 4023 lamination limiting post, 4024 positioning lamination mounting hole, 5 lamination cover, 6 first pressing plate, 7 motor housing sleeve, 8 second pressing plate, 9 motor housing, 10 motor silicone sleeve, 11 motor, 12 connecting shaft, 1201 connection limiting section, 1202 lamination cover limiting mounting section, 1203 second pressing plate mounting section, 1204 peristaltic assembly mounting section, 1205 vibration assembly mounting section, 13 limiting member.

5. SPECIFIC EMBODIMENT OF THE INVENTION

In order to make the objects, technical solutions and advantages of the embodiments of the present invention clearer, the technical solutions in the embodiments of the invention will be clearly and completely described below with reference to the drawings in the embodiments of the invention, and it is obvious that the described embodiments are some, but not all, embodiments of the invention. All other embodiments, which can be derived by a person skilled in the art from the embodiments given herein without making any creative effort, shall fall within the protection scope of the invention.

Embodiment 1

Figure 1:
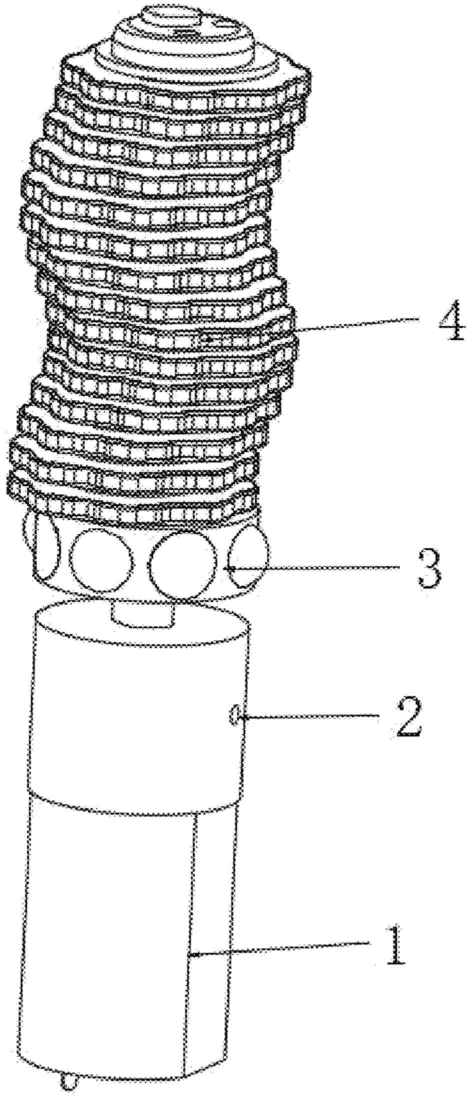
FIG. 1 is a schematic perspective view of a peristaltic structure according to embodiment 1 of the invention.
Figure 2:
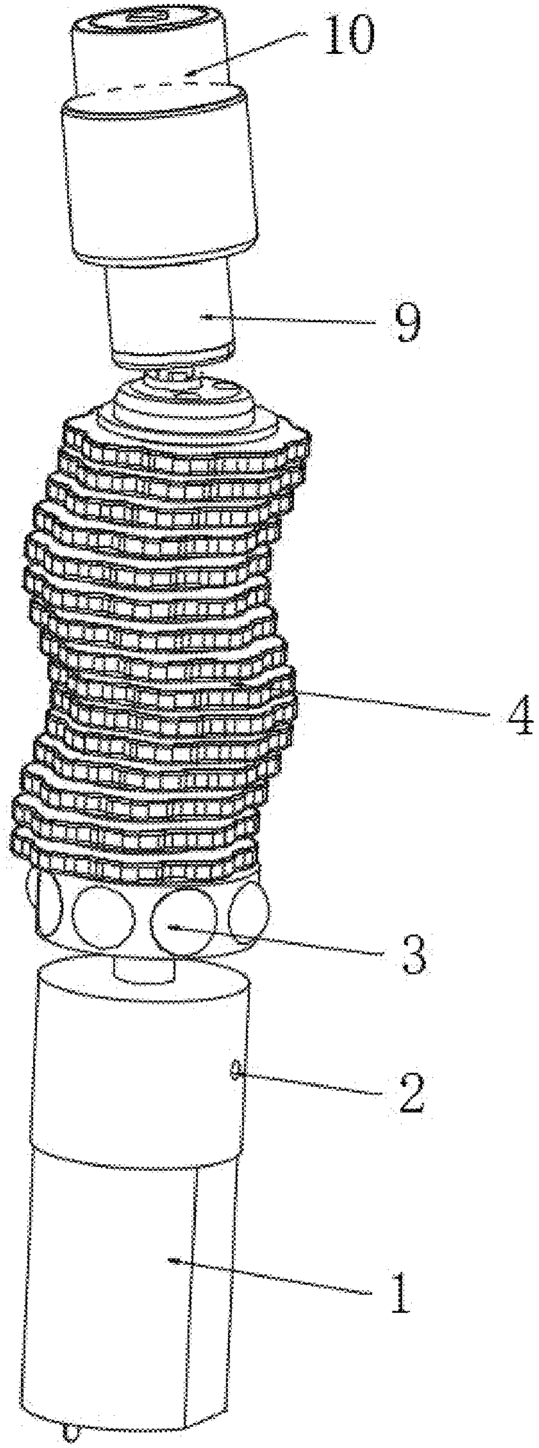
FIG. 2 is a schematic perspective view of a peristaltic structure according to embodiment 2 of the invention.
Figure 5:
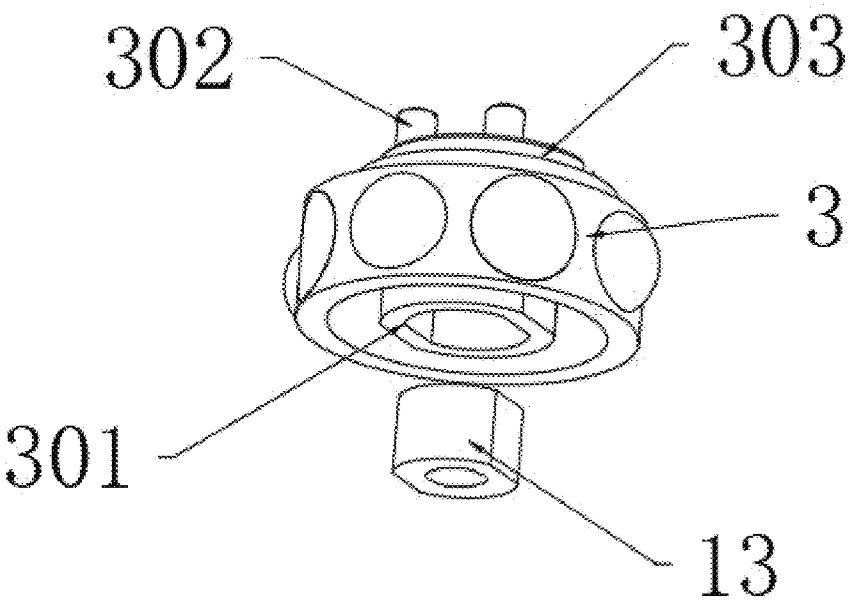
FIG. 5 is a structural diagram of the connecting member of the invention.
Figure 6:
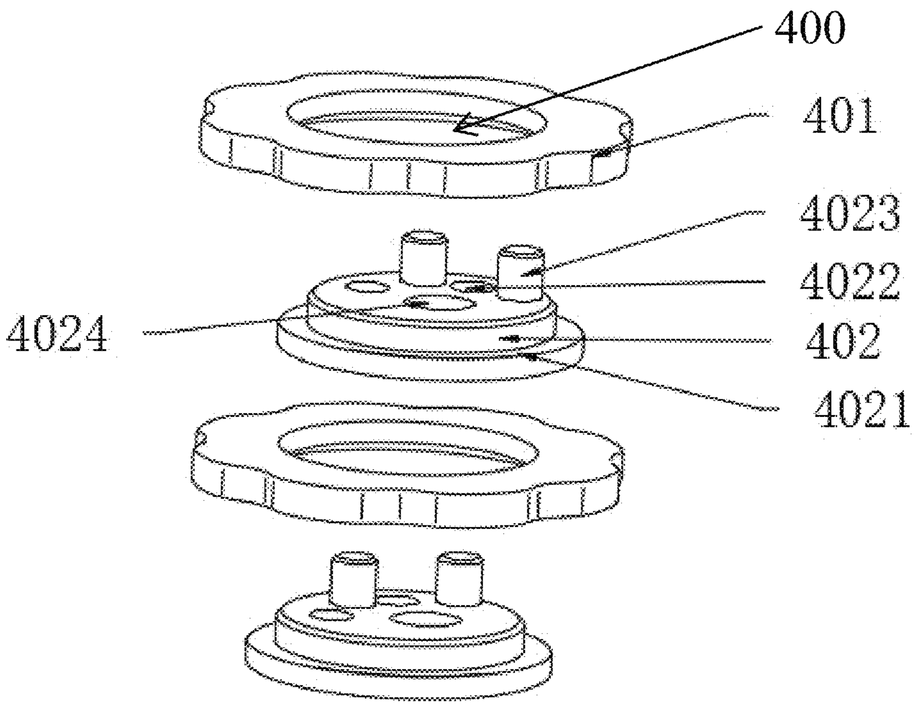
FIG. 6 is a structural diagram of the peristaltic laminations and the shaping laminations of the peristaltic lamination assembly of the invention.

Referring to FIG. 1, FIG. 5, and FIG. 6, the invention provides a peristaltic structure and a massage device, including an actuator 1, a connecting shaft 12, a connecting member 3, and a peristaltic lamination assembly 4;

the connecting shaft 12 is detachably mounted to an output end of the actuator 1;

the peristaltic lamination assembly 4 is detachably installed on the connecting shaft 12 via the connecting member 3.

In the embodiment, the peristaltic lamination assembly 4 comprises multiple sets of lamination assembly consisting of peristaltic laminations 401 and shaping laminations 402.

In the embodiment, each shaping lamination 402 is provided with a boss 4021, lamination limiting holes 4022, positioning lamination mounting holes 4024, and lamination limiting posts 4023; the peristaltic laminations 401 are provided with peristaltic lamination mounting holes; the lamination limiting holes 4022 and positioning lamination mounting holes 4024 are eccentric holes, while the lamination limiting posts 4023 are eccentric columns, the peristaltic lamination mounting holes cooperate with the bosses 4021; the shaping laminations 402 are mounted on the connecting shaft 12 via the positioning lamination mounting holes 4024; the lamination limiting holes 4022 are disposed on one side of the lamination limiting posts 4023; the lamination limiting holes 4022 and lamination limiting posts 4023 of two vertically adjacent positioning laminations are cooperated with each other; the peristaltic lamination 401 interlocks with the boss 4021 of the shaping lamination 402. The two lamination limiting holes 4022 of the second shaping lamination 402 securely engage with the two lamination limiting posts 4023 of the first piece of the shaping lamination 402, simultaneously fixing the vertical height position of the first piece of the peristaltic lamination 401. Multiple sets are assembled sequentially, allowing customizable lengths based on design requirements to form the peristaltic lamination assembly 4. The positioning lamination mounting holes 4024 on each lamination are eccentrically designed, so when a plurality of peristaltic laminations 401 are assembled, the entire peristaltic lamination assembly 4 exhibits an S-shaped profile, each shaping lamination 402 is equipped with two lamination limiting holes 4022 and two lamination limiting posts 4023.

In the embodiment, the peristaltic structure further includes a limiting member 13, the connecting member 3 is provided with a mounting limiting hole 301, a connecting boss 303, connecting limiting posts 302, and rotating beads; the connecting member 3 is detachably mounted to the connecting shaft 12 via the limiting member 13, the limiting member 13 is installed within the mounting limiting hole 301, the connecting limiting posts 302 cooperate with the lamination limiting holes 4022 of positioning laminations, the peristaltic laminations 401 are mounted on the connecting boss 303.

In the embodiment, the connecting member 3 is disposed between the actuator 1 and the peristaltic lamination assembly 4.

Figure 3:
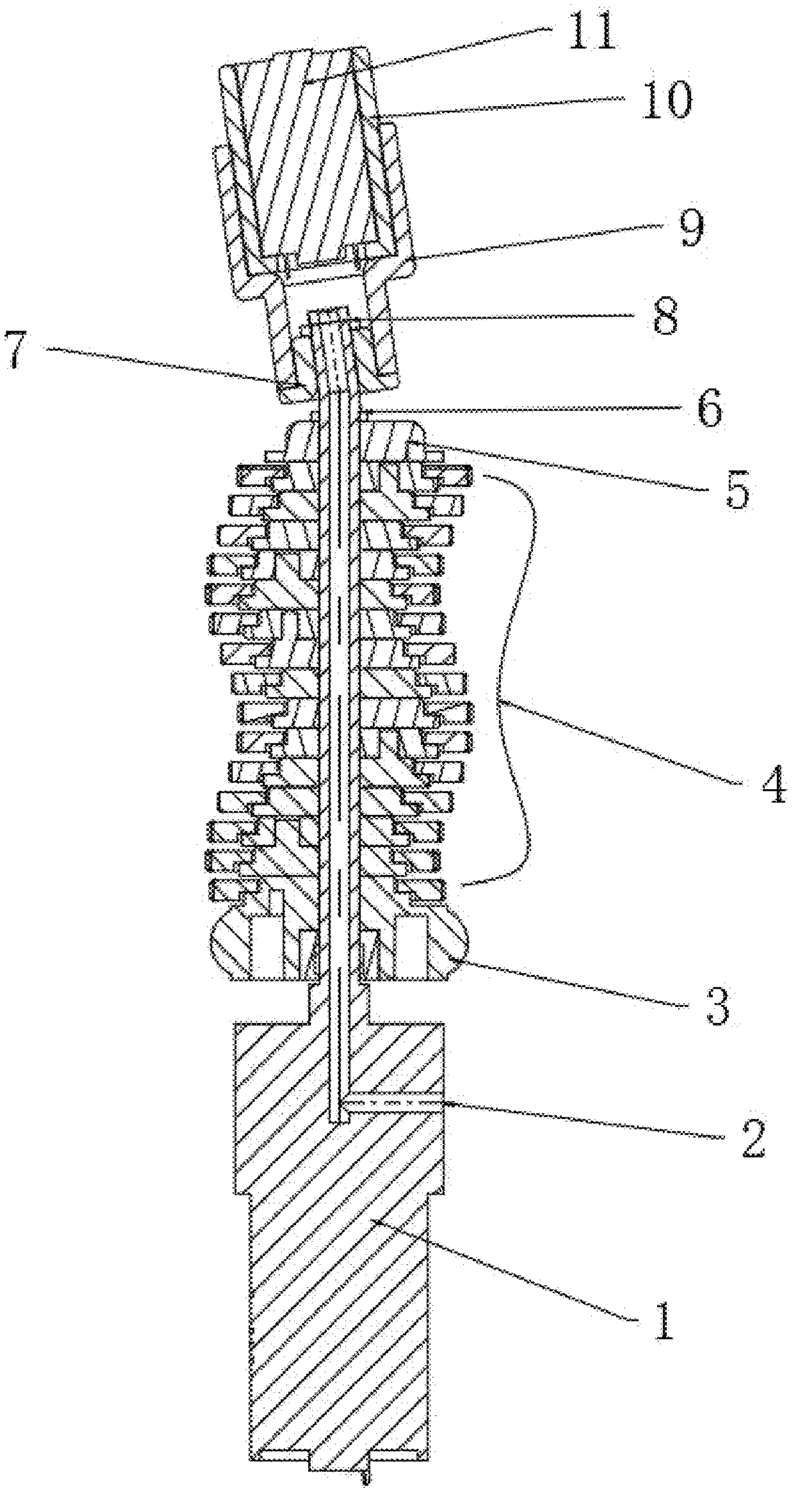
FIG. 3 is a cross-sectional view of a peristaltic structure according to embodiment 2 of the invention.
Figure 4:
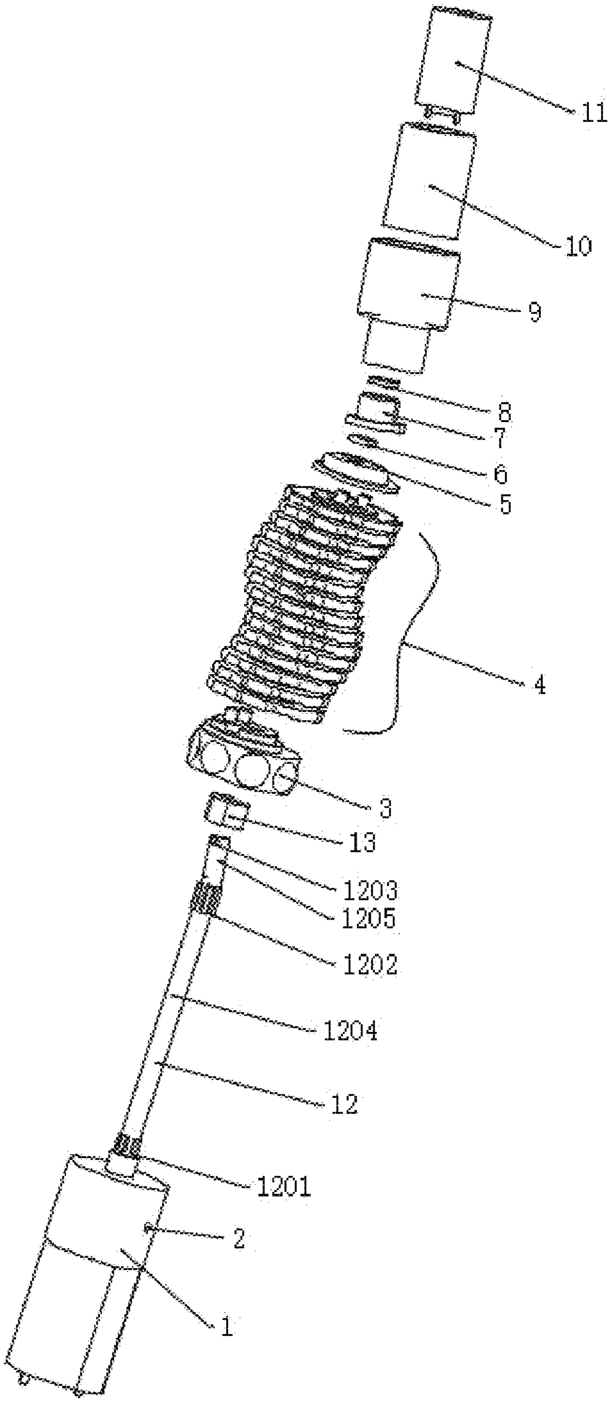
FIG. 4 is an exploded view of a peristaltic structure according to embodiment 2 of the invention.

In the embodiment, the peristaltic structure further includes a lamination cover 5 and a first pressing plate 6, the lamination cover 5 is compressed onto the peristaltic lamination assembly 4 via the first pressing plate 6, the structure of which can be referred to FIG. 3 and FIG. 4.

In the embodiment, the massage device includes a silicone sleeve, and the silicone sleeve is sleeved over an exterior of the peristaltic structure.

The assembly procedure is as follows: once the connecting member 3 is fixed to the connecting shaft 12, a central bore of the entire peristaltic lamination assembly 4 is threaded onto the connecting shaft 12. The peristaltic lamination mounting holes of the peristaltic laminations 401, along with the lamination limiting holes 4022 of two positioning spacers, are engaged with the connecting boss 303 and two connecting limiting posts 302 on the connecting member 3; subsequently, multiple sets of the lamination assembly are sequentially installed. The lamination cover 5 and the first pressing plate 6 are then mounted. Finally, the silicone sleeve is sleeved over the exterior of the peristaltic structure.

Advantages of the invention lies in that: 1. the peristaltic lamination assembly 4 of the invention is detachably mounted to the connecting shaft 12 via the connecting member 3, offering a simple structure and ease of operation; 2. the invention employs a plurality of peristaltic laminations 401 and shaping laminations 402 with eccentric structures to form a peristaltic lamination assembly 4, which eliminates the need for complex mechanical structures to solve the problem or making modifications to the connecting shaft 12 shape to achieve peristaltic motion, simplifying the design and facilitating installation; 3. the connecting member 3 is equipped with rotating beads, enabling combined peristaltic and rotational massage effects through rotating beads to enhance the massage performance;

Embodiment 2

Referring to FIG. 2 to FIG. 6, the invention provides a peristaltic structure and a massage device, including an actuator 1, a connecting shaft 12, a connecting member 3, and a peristaltic lamination assembly 4;

- the connecting shaft 12 is detachably mounted to an output end of the actuator 1;
- the peristaltic lamination assembly 4 is detachably installed on the connecting shaft 12 via the connecting member 3.

In the embodiment, the peristaltic lamination assembly 4 comprises multiple sets of lamination assembly consisting of peristaltic laminations 401 and shaping laminations 402.

In the embodiment, each shaping lamination 402 is provided with a boss 4021, lamination limiting holes 4022, positioning lamination mounting holes 4024, and lamination limiting posts 4023; the peristaltic laminations 401 are provided with peristaltic lamination mounting holes; the lamination limiting holes 4022 and positioning lamination mounting holes 4024 are eccentric holes, while the lamination limiting posts 4023 are eccentric columns, the peristaltic lamination mounting holes cooperate with the bosses 4021; the shaping laminations 402 are mounted on the connecting shaft 12 via the positioning lamination mounting holes 4024; the lamination limiting holes 4022 are disposed on one side of the lamination limiting posts 4023; the lamination limiting holes 4022 and lamination limiting posts 4023 of two vertically adjacent positioning laminations are cooperated with each other.

In the embodiment, the peristaltic structure further includes a limiting member 13, the connecting member 3 is provided with a mounting limiting hole 301, a connecting boss 303, connecting limiting posts 302, and rotating beads; the connecting member 3 is detachably mounted to the connecting shaft 12 via the limiting member 13, the limiting member 13 is installed within the mounting limiting hole 301, the connecting limiting posts 302 cooperate with the lamination limiting holes 4022 of positioning laminations, the peristaltic laminations 401 are mounted on the connecting boss 303.

In the embodiment, the connecting member 3 is disposed between the actuator 1 and the peristaltic lamination assembly 4.

In the embodiment, the peristaltic structure further includes a lamination cover 5 and a first pressing plate 6, the lamination cover 5 is compressed onto the peristaltic lamination assembly 4 via the first pressing plate 6.

In the embodiment, the massage device includes a silicone sleeve, and the silicone sleeve is sleeved over an exterior of the peristaltic structure.

In the embodiment, the invention further includes a vibration assembly and a silicone sleeve; the vibration assembly is disposed at one end of the connecting shaft 12, and the silicone sleeve is sleeved over an exterior of both the vibration assembly and the peristaltic structure.

In the embodiment, the vibration assembly includes a motor housing sleeve 7, a second pressing plate 8, a motor housing 9, a motor silicone sleeve 10 and a motor 11, the motor housing sleeve 7 is mounted to one end of the motor housing 9 to form a motor chamber, the motor silicone sleeve 10 is sleeved over the motor 11, the motor 11 is installed within the motor chamber, the motor housing sleeve 7 is secured to an end of the connecting shaft 12 via the second pressing plate 8.

In the embodiment, the connecting shaft 12 is provided with a connection limiting section 1201, a peristaltic assembly mounting section 1204, a lamination cover limiting mounting section 1202, a vibration assembly mounting section 1205, and a second pressing plate mounting section 1203, the connecting member 3 is mounted to the connection limiting section 1201 via the limiting member 13, the lamination cover 5 is installed on the lamination cover limiting mounting section 1202, the second pressing plate 8 is mounted to the second pressing plate mounting section 1203, the peristaltic lamination assembly 4 is installed on the peristaltic assembly mounting section 1204, the vibration assembly is mounted to the vibration assembly mounting section 1205, an axis of the peristaltic assembly mounting section 1204 and an axis of the vibration assembly mounting section 1205 are arranged at an angle; both the actuator 1 and the connecting shaft 12 are provided with cable feed-through holes 2, the cable feed-through hole 2 of the actuator 1 and the cable feed-through hole 2 of the connecting shaft 12 are interconnected, allowing cables to pass through the cable feed-through holes 2 and electrically connect to the motor 11.

Assembly of the rotating beads' peristaltic and oscillatory massage device: 1. a connecting cable of the motor 11 with vibrating head pass through an inner bore of the connecting shaft 12 and an inner bore of a housing of the actuator 1, with cable ends reserved at both sides for subsequent soldering to the internal vibration motor 11 and the PCB board; a central hole of the connecting member 3 is threaded onto the connection limiting section 1201 of the connecting shaft 12; central holes of multiple sets of the peristaltic lamination assembly 4 are then threaded onto the connecting shaft 12 and assembled onto the connecting member 3, which are further secured to the connecting shaft 12 via the lamination cover 5 and the first pressing plate 6 to prevent vertical movement of the lamination assembly during operation, avoiding displacement or jamming of the peristaltic laminations 401 between the lamination sets and ensuring the peristaltic function of the rotating bead. 2. After completing the assembly of the rotating bead peristaltic structure, a 5°-10° bend is formed at a distal end of the connecting shaft 12 using a jig, the motor housing sleeve 7 is loosely fitted into the connecting shaft 12, and the position is fixed with the second pressing plate 8. The internal vibration motor 11, pre-connected to the reserved positive and negative power cables, is encapsulated within the motor silicone sleeve 10 and installed into the motor housing 9, then the motor housing 9 and motor housing sleeve 7 are tightly assembled, with their joint reinforced using quick-drying adhesive. All components are now integrated with a reduction gearbox.

Operational principle of the rotating beads' peristaltic oscillation: the actuator 1 is connected to the program-controlled PCB board via power cables, with energy supplied by a lithium battery. Upon activation, the connecting shaft 12 of the reduction gearbox begins rotational motion, driving the connecting member 3 to rotate; semi-spherical beads on the connecting member 3 generate undulating frictional resistance during rotation, achieving a bead-rotating effect. When the connecting member 3 rotates, it drives the peristaltic lamination assembly 4 mounted on the connecting member 3 into motion. Since the lamination limiting holes 4022 and positioning lamination mounting holes 4024 on each positioning lamination are eccentric holes, and the lamination limiting posts 4023 are eccentric columns, the assembled multiple sets of peristaltic laminations 401 form a wave-like structure. When the connecting member 3 drives the peristaltic lamination assembly 4, the peristaltic lamination assembly 4 executes a helical wavy motion, producing peristaltic effects. As the rotational motion reaches a top end, the top end is bent for a certain angle of inclination, when the rotational movement of the connecting shaft 12 encounters the motor silicone sleeve 10 with an angle, the motor silicone sleeve 10 performs an oscillatory rotational motion. Combined with vibrations generated by the internal vibration motor 11, the peristalsis, oscillation, and vibration functions of the rotating beads are fully realized.

Advantages of the invention lies in that: 1. the peristaltic lamination assembly 4 of the invention is detachably mounted to the connecting shaft 12 via the connecting member 3, offering a simple structure and ease of operation; 2. the invention employs a plurality of peristaltic laminations 401 and shaping laminations 402 with eccentric structures to form a peristaltic lamination assembly 4, which eliminates the need for complex mechanical structures to solve the problem or making modifications to the connecting shaft 12 shape to achieve peristaltic motion, simplifying the design and facilitating installation; 3. the connecting member 3 is equipped with rotating beads, enabling combined peristaltic and rotational massage effects through rotating beads to enhance the massage performance; 4. by integrating the vibration assembly at an angle relative to the peristaltic structure, the vibration assembly generates oscillatory rotation. Combined with vibrations from the internal vibration motor 11, the device achieves triple-action functionality (peristalsis, oscillation, and vibration), delivering multifunctional effects and superior user experience.

Embodiment 3

Figure 7:
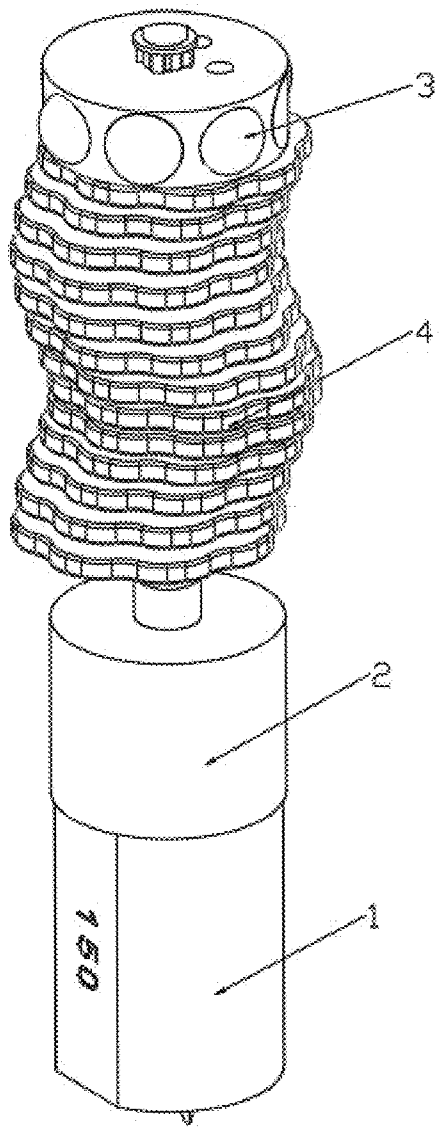
FIG. 7 is a structural diagram of embodiment 3 of the invention.

Referring to FIG. 5, FIG. 6, and FIG. 7, a peristaltic structure and a massage device, including an actuator 1, a connecting shaft 12, a connecting member 3, and a peristaltic lamination assembly 4;

the connecting shaft 12 is detachably mounted to an output end of the actuator 1;

the peristaltic lamination assembly 4 is detachably installed on the connecting shaft 12 via the connecting member 3.

In the embodiment, the peristaltic lamination assembly 4 comprises multiple sets of lamination assembly consisting of peristaltic laminations 401 and shaping laminations 402.

In the embodiment, each shaping lamination 402 is provided with a boss 4021, lamination limiting holes 4022, positioning lamination mounting holes 4024, and lamination limiting posts 4023; the peristaltic laminations 401 are provided with peristaltic lamination mounting holes; the lamination limiting holes 4022 and positioning lamination mounting holes 4024 are eccentric holes, while the lamination limiting posts 4023 are eccentric columns, the peristaltic lamination mounting holes cooperate with the bosses 4021; the shaping laminations 402 are mounted on the connecting shaft 12 via the positioning lamination mounting holes 4024; the lamination limiting holes 4022 are disposed on one side of the lamination limiting posts 4023; the lamination limiting holes 4022 and lamination limiting posts 4023 of two vertically adjacent positioning laminations are cooperated with each other.

In the embodiment, the peristaltic structure further includes a limiting member 13, the connecting member 3 is provided with a mounting limiting hole 301, a connecting boss 303, connecting limiting posts 302, and rotating beads; the connecting member 3 is detachably mounted to the connecting shaft 12 via the limiting member 13, the limiting member 13 is installed within the mounting limiting hole 301, the connecting limiting posts 302 cooperate with the lamination limiting holes 4022 of positioning laminations, the peristaltic laminations 401 are mounted on the connecting boss 303.

In the embodiment, the peristaltic lamination assembly 4 is disposed between the actuator 1 and the connecting member 3;

In the embodiment, the massage device includes a silicone sleeve, and the silicone sleeve is sleeved over an exterior of the peristaltic structure.

The only difference between the embodiment and embodiment 1 is that the peristaltic lamination assembly 4 is disposed between the actuator 1 and the connecting member 3.

The assembly procedure is as follows: a central bore of the entire peristaltic lamination assembly 4 is threaded onto the connecting shaft 12. The peristaltic laminations 401 are sequentially installed by aligning the peristaltic lamination mounting holes with the lamination limiting holes 4022 of two positioning spacers, thereby forming the peristaltic lamination assembly 4. Finally, the connecting member 3 is mounted, and the peristaltic lamination assembly 4 is assembled with the connecting member 3. Finally, the silicone sleeve is sleeved over the exterior of the peristaltic structure.

The foregoing descriptions merely illustrate specific embodiments of the present invention. However, the scope of protection is not limited thereto. Any modification or replacement conceivable by those skilled in the art within the technical scope disclosed herein shall be encompassed within the protection scope of the invention. Consequently, the scope of protection shall be defined by the appended claims.

What is claimed is:

1. A peristaltic structure, comprising:

an actuator, a connecting shaft, a connecting member, and a peristaltic lamination assembly;

the connecting shaft is detachably mounted to an output end of the actuator, the peristaltic lamination assembly is detachably installed on the connecting shaft via the connecting member;

wherein the peristaltic lamination assembly comprises multiple sets of lamination assemblies consisting of peristaltic laminations and shaping laminations;

wherein each shaping lamination is provided with a boss, lamination limiting holes, a positioning lamination mounting hole, and lamination limiting posts;

the peristaltic laminations are each provided with a peristaltic lamination mounting hole;

the lamination limiting holes and the positioning lamination mounting hole of each shaping lamination are eccentric holes, while the lamination limiting posts of each shaping lamination are eccentric columns, the peristaltic lamination mounting hole of each peristaltic lamination cooperate with the boss of an adjacent shaping lamination;

each shaping lamination is mounted on the connecting shaft via its respective positioning lamination mounting hole;

the lamination limiting holes are disposed on one side of the lamination limiting posts;

the lamination limiting holes and lamination limiting posts of two vertically adjacent positioning laminations are cooperated with each other;

wherein the peristaltic structure further includes a limiting member, the connecting member is provided with a mounting limiting hole, a connecting boss, and connecting limiting posts, the connecting member is detachably mounted to the connecting shaft via the limiting member, the limiting member is installed within the mounting limiting hole, the connecting limiting posts cooperate with the lamination limiting holes of the shaping laminations, and the peristaltic laminations are mounted on the connecting boss.

2. The peristaltic structure of claim 1, wherein the connecting member is disposed between the actuator and the peristaltic lamination assembly.

3. The peristaltic structure of claim 2, wherein the peristaltic structure further includes a lamination cover and a first pressing plate, the lamination cover is compressed onto the peristaltic lamination assembly via the first pressing plate.

4. The peristaltic structure of claim 1, wherein the peristaltic lamination assembly is disposed between the actuator and the connecting member.

* * * * *